United States Patent [19]

Pomichter, Jr.

[11] Patent Number: 5,297,244
[45] Date of Patent: Mar. 22, 1994

[54] METHOD AND SYSTEM FOR DOUBLE ERROR ANTIALIASING IN A COMPUTER DISPLAY SYSTEM

[75] Inventor: Gerald P. Pomichter, Jr., Saugerties, N.Y.

[73] Assignee: International Business Machines Corporation, Armonk, N.Y.

[21] Appl. No.: 949,296

[22] Filed: Sep. 22, 1992

[51] Int. Cl.$^5$ ............................................. G06F 15/62
[52] U.S. Cl. ................................. 395/143; 395/142; 395/162
[58] Field of Search ..................... 395/140–143, 395/150, 151, 162, 163; 340/739

[56] References Cited

U.S. PATENT DOCUMENTS 4,855,935 8/1989 Lien et al. ................... 340/739 X
4,873,515 10/1989 Dickson et al. ............. 395/163 X

OTHER PUBLICATIONS

Computer Graphics Principles and Practice–Foley et al., pp. 72–91, 1990.

Primary Examiner—Heather R. Herndon
Assistant Examiner—Almis Jankus
Attorney, Agent, or Firm—Duke W. Yee; Andrew J. Dillon

[57] ABSTRACT

A method and system for generating an antialiased approximation of a line displayed within a data processing system having a raster-scan device for generating images within a two-dimensional grid comprising rows and columns of pixels. A plurality of parameters are generated according to Bresenham's algorithm for the line, including first error term and a second error term. A pixel intensity for an initial pixel for the pixel approximation of the line is generated. The first error term is compared with a threshold to determine an amount of error. The first error term is adjusted by a first selected amount in response to the comparison of the first error term, and the second error term is adjusted by a second selected amount in response to the comparison of the first error term. A pixel proximate to the initial pixel is selected by comparing the first adjusted error term with a second threshold to locate a pixel closest to a point on the line. The pixel is assigned a first intensity based on a comparison of the second adjusted error term with the first error term. Another pixel proximate to the pixel is selected in response to selecting the pixel. This another pixel is a assigned a second intensity based on a comparison of the second adjusted error term with the first error term.

16 Claims, 10 Drawing Sheets

METHOD AND SYSTEM FOR DOUBLE ERROR ANTIALIASING IN A COMPUTER DISPLAY SYSTEM

RELATED APPLICATION

This application is related to an application for U.S. patent application Ser. No. 902,324, filed Jun. 22, 1992 and entitled "METHOD AND APPARATUS FOR DRAWING ANTIALIASED LINES ON A RASTER DISPLAY", incorporated herein by reference.

BACKGROUND OF THE INVENTION

1. Technical Field

The present invention relates in general to the display of lines in a computer display system and in particular to a method and system for antialiasing lines displayed in a raster format within a computer display system. Still more particularly, the present invention relates to a method and system for antialiasing lines by generating an antialiased pixel approximation of a line in a computer display system.

2. Description of the Related Art

Visual display clarity is a problem faced by computer system developers. Graphics, including the set of text characters, are typically displayed using a raster image. The raster image is a rectangular array of rectangular picture elements known as pixels. Pixels are arranged on the computer display screen in rows and columns.

Image clarity problems typically occur when a continuous image is displayed using discrete pixels. The problem is most visible in the non-vertical and non-horizontal parts of a graphic image. For example, a line that is neither vertical nor horizontal will look jagged or stair-stepped because the line is constructed of rectangular pixels. This problem is called aliasing.

One method of solving aliasing problems is to employ a display with a greater number of pixels per square inch. With a higher resolution display, the stair-steps are smaller and therefore less noticeable. This solution, however, is expensive because of the high cost of high resolution displays. This option may not always be possible because of limited speed capability of the electronic components utilized in the display.

Another method of anti-aliasing involves modifying or blurring the pixels in the region near the jagged edge of the graphic image. Blurring the jagged edges reduces the contrast and makes the jagged edges less noticeable. In the edge blurring technique, both the brightness and color of the graphic image, and the background behind the image, may be considered when computing the new brightness and color of pixels near the jagged edge of the graphic image.

In converting a line into coordinates for pixels on a two-dimensional raster grid, the basic strategy employed by typical line scan-conversion algorithms is to increment x and calculate $y = mx + b$. A pixel is selected at (x, ROUND (y)) where ROUND (y) is a function that determines the y coordinate of the pixel closest to the y value calculated. These x and y values correspond to points on a grid wherein the intersection of x and y values associated with grid points are often referred to as "picture elements" or "pixels".

Most conventional raster displays rasterize a continuous line one pixel at a time, with each pixel being generated in sequence. Bresenham's algorithm is perhaps the most widely used algorithm for presenting lines on a raster display Bresenham's algorithm is explained in many computer graphics text books. For example, a description of the algorithm, as well as its derivation, are presented at pages 71-78 of *Computer Graphics: Principles and Practice* by Foley, Van Dam, Feiner, and Hughes, Addison-Wesley Publishing Company, Inc. (2d Ed. 1990), which is incorporated herein by reference.

Bresenham's algorithm determines a running error term as well as correction terms to be applied to the running error term as various pixel locations are chosen to represent the line. The initial error term and each of the correction terms is determined from the total x and y displacements traversed by the line. For each particular pixel, the error term associated with that pixel reflects the amount that the pixel deviates from the true line location. As a result, error terms for various pixels may be utilized to determine which pixels are closest to the actual line.

As pixel locations are sequentially selected and the algorithm is reiterated to select subsequent pixel locations, an appropriate error term is added to the running error term to account for changes in the error term produced by selecting the previous pixel location. Bresenham's algorithm is continued until the end of the line is reached and the last pixel location is selected.

An inherent problem with drawing a Bresenham line is that it appears very rough or jagged. Additionally, presently available methods and systems do not display Bresenham lines with as much precision as desired since they utilize integer endpoints.

Therefore, it would be desirable to have a method and system for producing lines that are visually smooth and positioned accurately with respect to subpixel endpoints.

SUMMARY OF THE INVENTION

It is therefore one object of the present invention to provide a method and system for line smoothing in a computer display system.

It is another object of the present invention to provide a method and system for smoothing Bresenham lines in a computer display system.

It is yet another object of the present invention to provide a method and system for smoothing and accurately positioning Bresenham lines with respect to subpixel endpoints in a computer display system.

The foregoing objects are achieved as is now described. A method and system for generating an antialiased approximation of a line displayed within a data processing system having a raster-scan device for generating images within a two-dimensional grid comprising rows and columns of pixels is disclosed. A plurality of parameters are generated according to Bresenham's algorithm for the line, including first error term and a second error term. A pixel intensity for an initial pixel for the pixel approximation of the line is generated. The first error term is then compared with a threshold to determine an amount of error. The first error term is adjusted by a first selected amount in response to the comparison of the first error term, and the second error term is adjusted by a second selected amount in response to the comparison of the first error term. A pixel proximate to the initial pixel is then selected by comparing the first adjusted error term with a second threshold to locate a pixel closest to a point on the line. The pixel is assigned a first intensity based on a comparison of the second adjusted error term with the first error term.

The magnitude of the difference between the first error term and the second error term is the intensity error term. This intensity error term is compared against a selected threshold to determine the intensity for the pixel. A second pixel proximate to the first pixel is selected in response to selecting the pixel. This second pixel is assigned a second intensity based on a comparison of the second adjusted error term with the first error term.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
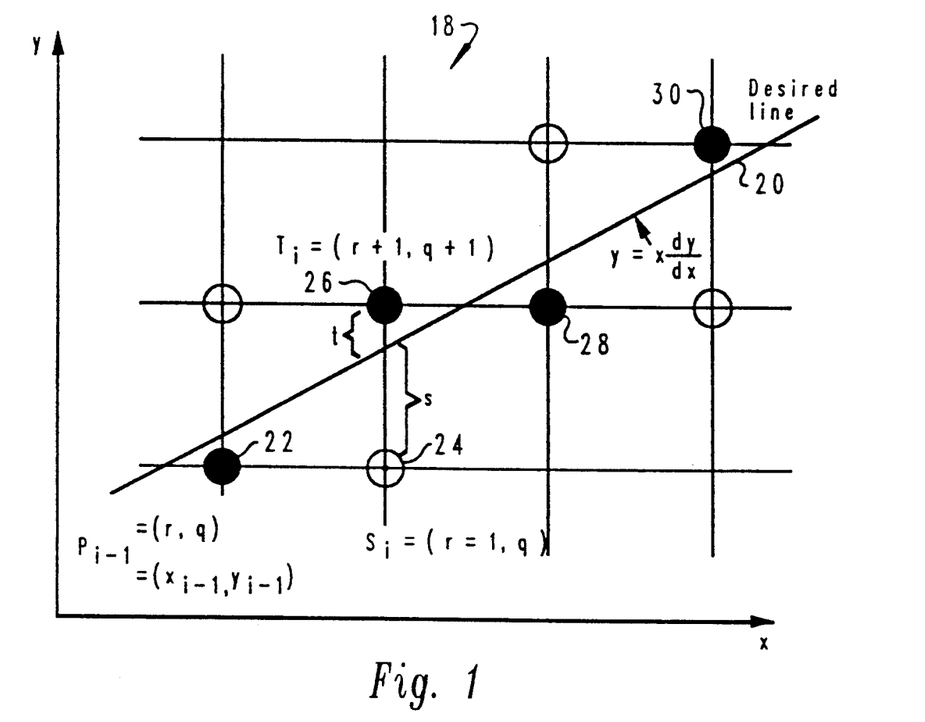
FIG. 1 depicts a graphic illustration of the problem of representing a continuous linear function on a two-dimensional grid of discrete points.

The problem addressed by the present invention is that of representing a continuous linear function through the selection of discreet locations in a two-dimensional grid within a computer display system that are closest in location to the true coordinates of the function. This situation is illustrated in FIG. 1. Two-dimensional grid contains line 20. True x and y values for the linear function $y = x \, (dy/dx)$ are contained in line 20. Integer pixel coordinates (that locate the pixel centers) must be determined for the pixels which lie closest to the true values of the coordinates for line 20 in order to map the linear function onto two-dimensional grid 18.

Because of the symmetry of the orthogonal coordinate system, any function which exhibits a linear relationship with one of the pixel coordinates may be normalized to appear in the form illustrated in FIG. 1. As a result, the situation may be simplified by restricting the location of the linear function to within the octant of the coordinate system where $0 <= dy <= dx$, where $dx = x2 - x1$ and $dy = y2 - y1$ for a linear function which extends between the coordinates $(x1, y1)$ and $(x2, y2)$. Additionally, no loss in generality of the function represented occurs when one end point of the function is located at the origin of the coordinate system because functions with other origins are simply translations of functions which begin at coordinate $(0, 0)$.

With these considerations in mind, the process of mapping a continuous linear function onto a grid having discreet x- and y-coordinates, such as, for example, rasterizing a line onto a pixel grid, becomes a matter of choosing one of two possible y coordinate values to provide the pixel location closest to the true line, for a given x-coordinate value of the pixel. Thus, in FIG. 1, if pixel 22 has been determined to be closest to the actual line being drawn, during the previous or $(i-1)$th step, the task at the ith step is to determine whether pixel 24 or pixel 26 is closest to line 20. If the distance between pixel 24 and line 20 is less than the distance between pixel 26 and line 20, then pixel 24 should be chosen; otherwise, pixel 26 should be chosen. In FIG. 1, the distance between pixel 24 and line 20 is designated as s, and the distance between pixel 26 and line 20 is designated as t. The decision of which pixel to select is dependent on whether s is less than t. In other words, if $(s-t) < 0$, pixel 24 is chosen. If $(s-t)$ is zero or positive, pixel 26 is chosen.

Bresenham's algorithm provides a technique for repetitively making this selection between two possible pixel locations, for each x-coordinate value of the pixel grid which is traversed by line 20. Bresenham's algorithm begins at the pixel closest to the origin and sequentially determines, one at a time for each successive x-coordinate value for the pixels required to represent the line, which of the two possible y-coordinate values should be chosen for each of the x-coordinate values. The algorithm makes this decision by computing a running error term which is proportional to $(s-t)$. Since the error term is proportional to $(s-t)$, the sign of the error term determines whether s is smaller than or larger than t and, which of the two possible y-coordinate values is closest to the true line.

According to Bresenham's algorithm, an initial error term defined by $2dy - dx$ is calculated for the pixel location closest to the origin. For the next x-coordinate value of the pixel grid, the sign of this initial error term determines the correct y-coordinate value for the pixel closest to the line. The error associated with this later choice of the pixel's y-coordinate value is accounted for by calculating a new error term. This new error term is calculated by adding an increment to the previous error term. The increment added depends on whether or not the previous error term was negative. A negative error term results in an increment defined as $2dy$; otherwise an increment defined as $2(dy - dx)$ is utilized. The sign of the resulting new error term is then utilized to determine the correct y-coordinate value for the next pixel.

Applying the methodology of Bresenham's algorithm to FIG. 1, in order to determine at the ith step which of pixels 24 and 26 should be chosen, the error term for pixel 22 is first computed. If the sign of the resulting error term is negative, pixel 24 is chosen and the quantity (2dy) is added to the error term calculated for pixel 22. If the error term at pixel 22 is positive, then pixel 26 is chosen and the quantity 2(dy−dx) is added to the error term for pixel 22. Similar application of the algorithm at subsequent steps results in pixels 28 and 30 being chosen.

Figure 2:
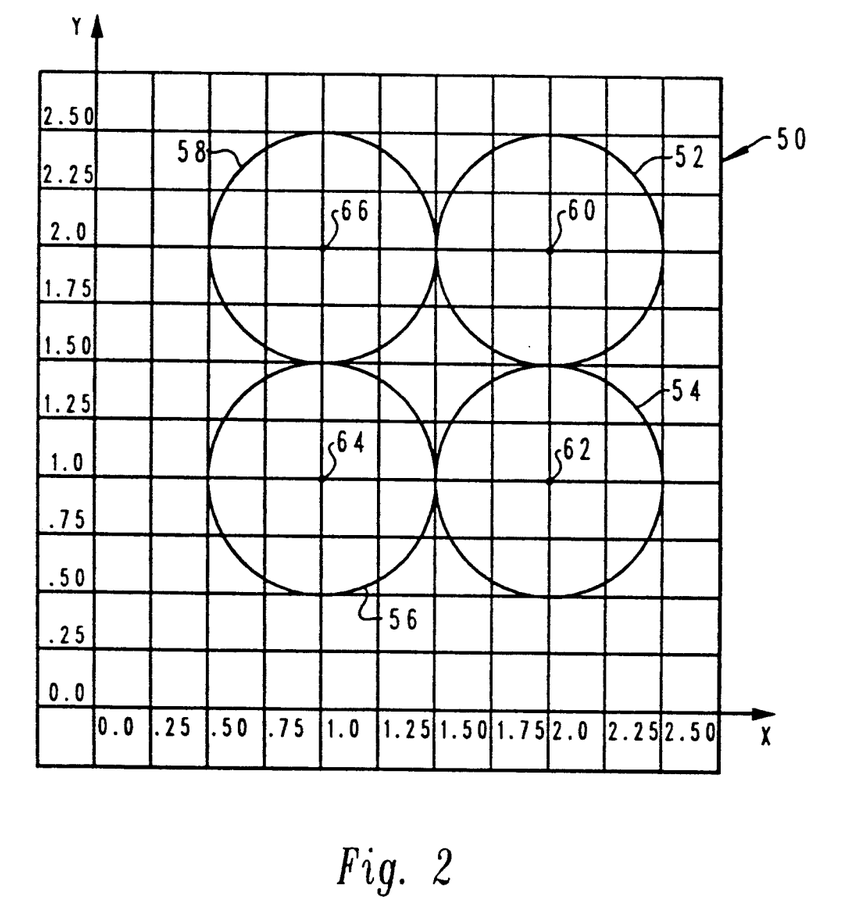
FIG. 2 is a graphic illustration of two-dimensional grid with pixels divided into subpixels.

In accordance with a preferred embodiment of the present invention, subpixel addressing is utilized in order to provide more accurate representations of a line on a two-dimensional grid. Referring now to FIG. 2, there is illustrated a two-dimensional grid 50 with pixels divided into subpixels. Two-dimensional grid 50 includes pixels 52, 54, 56, and 58. Pixel centers 60, 62, 64, and 66 for these pixels are located at integer boundaries. Each pixel may be subdivided into 16 subpixels as may be seen from two-dimensional grid 50. A pixel may be further subdivided into more pixels, such as 64 or 256 subpixels, to provide for greater accuracy.

In accordance with a preferred embodiment of the present invention, a Bresenham vector generator, extended to handle subpixel addressing, is employed to perform a two pixel approximation of the line. A Bresenham algorithm with subpixel addressing capabilities may be implemented in the following pseudocode where the x-axis is the major axis:

```
Draw_Point(X0, Y0);
while length > 0 do
{
  if Err < 0 then
     Err = Err + INC1
  else
     Err = Err + INC2;
  if Xmaj then
  {
     if Err > = 0 then Y = Y +y_inc;
     X = X + x_inc
  }
  else
  {
     if Err > = 0 then X = X + x_inc;
     Y = Y + y_inc;
  }
  length = length −1
  Draw_Point(X,Y);
}
```

In this process, length is the length of the line. Xmaj is true if the x-axis is determined to be the major axis, x_inc and y_inc represent the per step increment in the x and y axis respective. In employing the Bresenham's algorithm with subpixel addressing, the following parameters are utilized during initialization:

INC1=dmin shl (fract_bits+1)
INC2=INC1−dmaj shl (fract_bits+1)
Err=2dmin*majoff−2dmaj*minoff−dmaj shl(fract_bits)

The change in the major axis is represented by dmaj (dx in the above depicted pseudo code), while the change in the minor axis is represented by dmin (dy in the above depicted pseudo code). Next, majoff and minoff are the subpixel offsets of the starting point of the line. INC1 is the error term increment when stepping only in the major axis direction. INC2 is the error term increment when stepping in both the major and minor directions.

Err is the initial error term for the first pixel in a Bresenham line; shl represents a binary shift left operation. "shl" is a function that shifts all of the 1's and 0's in a binary representation of a number left by some amount. x1 shl fract bits represents a shift of x1 by fract_bits. This function represents a multiplication of x1 by $2^n$, where n is equal to the number of fract_bits.

Unlike prior processes and algorithms, the method and system of the present invention does not utilize the Bresenham error term (determinant) directly to derive the coverage of the pixel. Instead, the method and system of the present invention employs the Bresenham term to determine which pixels to plot, and as a comparison to a second error term.

In accordance with a preferred embodiment of the present invention, a double error method and system is employed to improve the smoothing and accuracy of Bresenham lines. The normal error term (Err) is combined with a second error term (Err_2) which approximates Err. This new error term, Err_2, is utilized to determine the coverage of a pixel (COVER) which is hit by the line.

For each step in the major axis, the coverage of a pixel (COVER) will increment by either REGION or REGION+1. REGION is an integer which varies from 0 to 15 (assuming 4 fract bits), where each step in REGION represents a slope decrease of 1/(1 shl fract_bits). REGION may be determined in various ways well known in the art. One such method is illustrated in U.S. Pat. No. 4,878,182, which is incorporated herein by reference.

Figure 3:
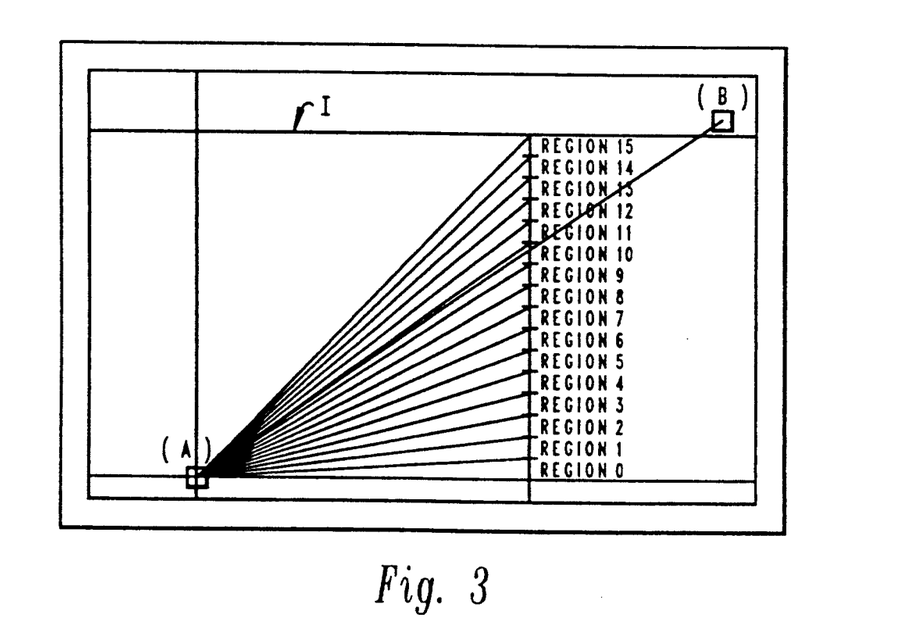
FIG. 3 depicts a graphical illustration of slope approximations or REGIONS.

Referring now to FIG. 3, there is depicted a graphic illustration of slope approximations or regions. The first octant, octant I, for a pixel at point A may be divided into 16 regions. The line from point A to point B is contained within region 11. Although the depicted illustration shows 16 regions, other numbers of regions may be utilized. The REGION value may be determined utilizing the following pseudo code:

```
(*****************************************************)
(*DETERMINE REGION (R)                                )
(*****************************************************)
R: B;
LINE_EQU: = 32*DMIN − 16*DMAJ;
FOR I: = 1 TO 4 do
BEGIN
   CASE I OF
      1: FAC:=8;
      2: FAC:=4;
      3: FAC:=2;
      4: FAC:=1;
   END;
   IF LINE_EQU > 8 THEN
   BEGIN
      R:=R*FAC;
      LINE EQU: = (FAC*DMAJ);
   END
   ELSE
   BEGIN
      LINE_EQU:=LINE_EQU*(FAC*DMAJ);
   END;
END;
```

In order to decide which increment to COVER is appropriate, REGION or REGION+1, the second error term, Err_2, will be accumulated in the same manner as Err in accordance with a preferred embodiment of the present invention. This error term is initially equal to Err (Err_$2_o$=Err$_o$). For Err_2, two increment terms are defined as follows:

INC_21 = 2Region*dmaj
INC_22 = INC_21 - dmaj shl (fract_bits)

Increment terms INC_21 and INC_21+2dmaj provide an approximation to INC1, such that INC_21 ≤ INC1 ≤ INC_21+2*dmaj. Similarly, INC_22 and INC_22+2*dmaj approximate INC such that INC_22 ≤ INC2 ≤ INC_22+2dmaj.

When Err is less than zero, Err_2 is updated as follows: Err_ = Err_2+INC_21. Err_2 is compared to Err to determine if the distance between Err and Err_2 is less than dmaj. If so this error term, Err_2, is the nearest approximation to Err that can be made. Consequently, COVER should be incremented by REGION. Otherwise, Err_2+2dmaj is the nearest approximation to Err and COVER is incremented by REGION+1. By utilizing the closest approximation to Err, a proper COVER may be calculated, thus producing the smoothest line possible. Additionally, in assigning pixel intensities, COVER is subtracted from 16 in accordance with a preferred embodiment of the present invention.

The following is pseudo code for updating the COVER

```
if abs(Err — Err_2) < = dmaj then
    COVER = COVER + Region
else
{
    Err_2 = Err_2 + 2*dmaj;
    COVER = COVER + Region + 1;
}
```

In a similar fashion, when Err > =0, Err_2 is updated as follows: Err_2 = Err_2+INC_2

If Err_2 is within dmaj of Err, then this is the nearest approximation to Err and COVER=COVER+Region. Otherwise, if the difference is greater than dmaj, Err_2 +2*dmaj is the nearest approximation to Err and COVER=COVER+Region+1. The result of these computations is basically a ping pong effect, where Err_2 is approximating Err and is either slightly less than, or slightly greater than Err.

Once COVER is found for the pixel nearest the line, it can be used to find the next nearest pixel to the line and that pixel will receive the remainder of the coverage (16−COVER).

Figure 4:
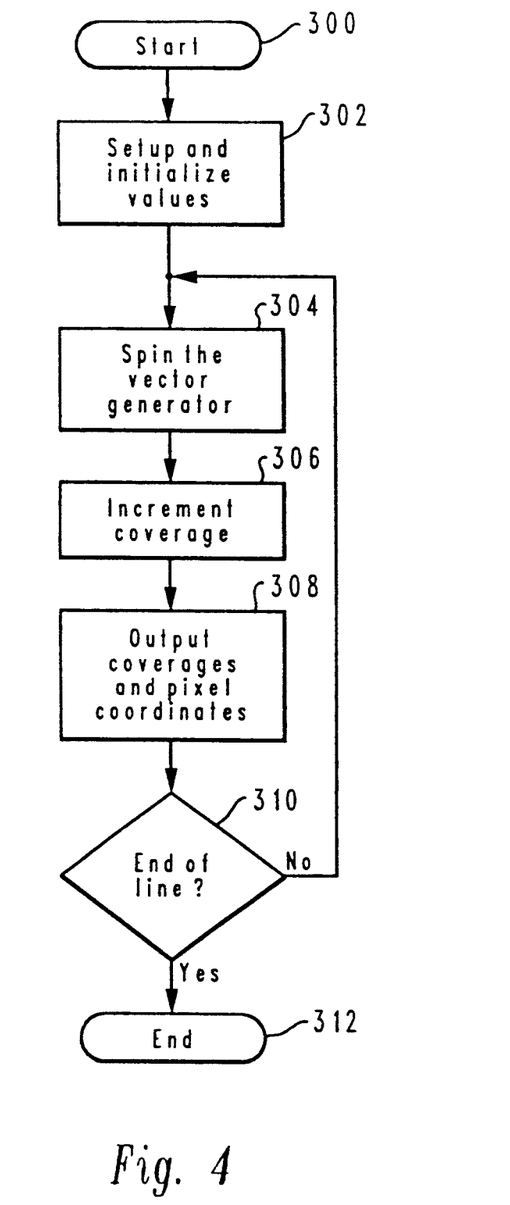
FIG. 4 is a high level flowchart for generating pixels in a line or vector in accordance with a preferred embodiment of the present invention.

Referring now to FIG. 4, there is depicted a high level flowchart for generating pixels in a line or vector utilizing a double error method in accordance with a preferred embodiment of the present invention. The process begins as illustrated in block 300 and thereafter proceeds to block 302, which depicts the set up and initialization of values for use in producing an antialiased line on a video display. The process then proceeds to block 304, which illustrates the spinning of the vector generator. In this portion of the process, error terms Err and Err_2 for the vector or line being antialiased are incremented.

Afterward, the process proceeds to block 306, which depicts the incrementation of the coverage (COVER). COVER is the area of coverage of a pixel and is an integer utilized to determine pixel intensity for a particular pixel. The process then proceeds to block 308, which illustrates the output of coverages. In this step, pixels that are generated as part of the line or vector are assigned an intensity based on the comparison of the second Bresenham error term with the first Bresenham error term (Err and Err_2).

The process then proceeds to block 310, which depicts a determination of whether or not the end of the line has been reached. If the end of the line has not been reached, the process returns to block 304 to generate additional pixels within the line or vector. If the end of the line has been reached, the process terminates as illustrated in block 312.

Figure 5:
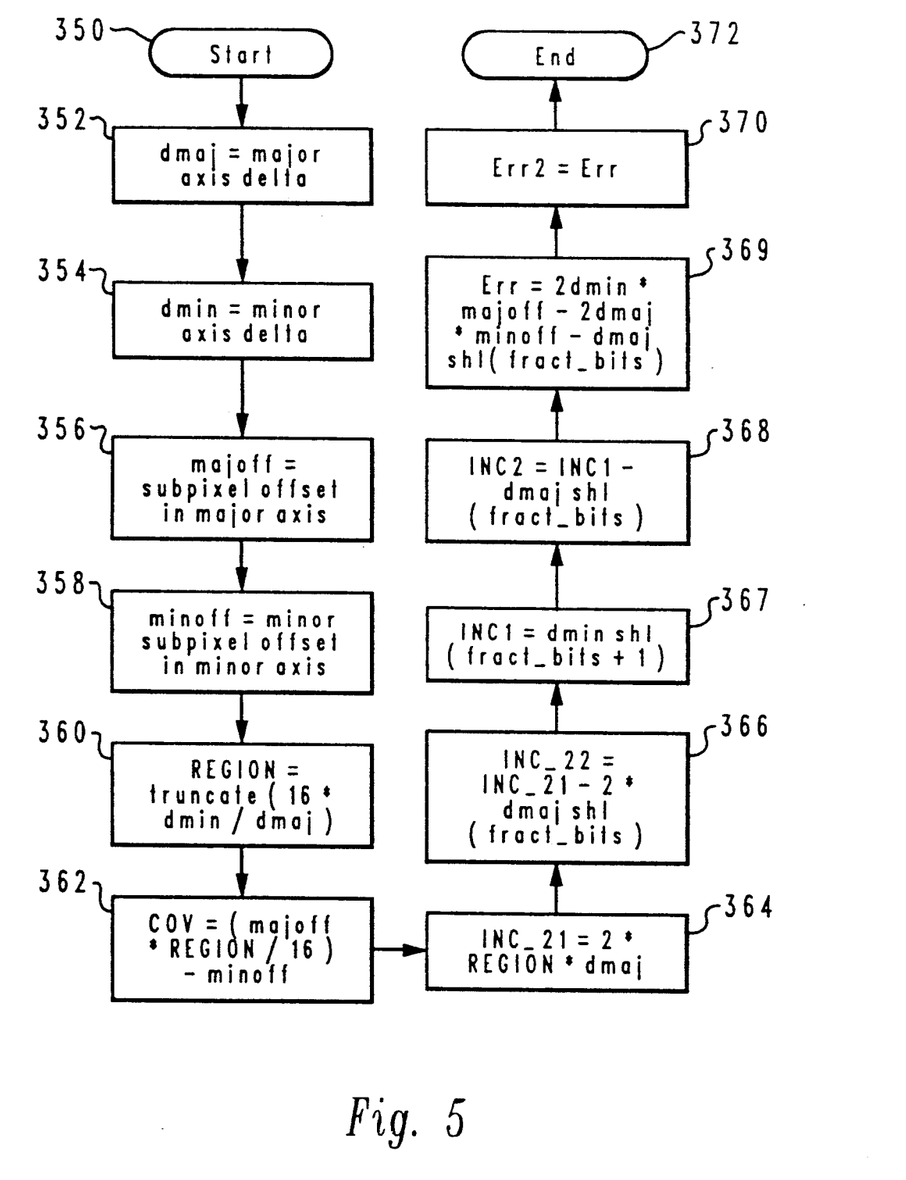
FIG. 5 depicts a logical flowchart of the process followed to initialize values for utilization in antialiasing a line in accordance with a preferred embodiment of the present invention.

With reference now to FIG. 5, there is depicted a logical flowchart of the process followed to initialize values for utilization in antialiasing a line in accordance with a preferred embodiment of the present invention. As illustrated, the process begins in block 350 and thereafter proceeds to block 352, which depicts setting dmaj equal to the major axis delta. Thereafter the process proceeds to block 354, which illustrates the dmin equal to the minor axis delta. For a line having endpoints (x0,y0) and (x1,y1) with the x-axis being the major axis, dmaj is equal to x1−x0 and dmin is equal to y1−y0.

Next, the process proceeds to block 356, which depicts setting majoff equal to the major subpixel offset in the major axis. Then, minoff is set equal to the minor subpixel offset in the minor axis as illustrated in block 358. The process then proceeds to block 360, which depicts the setting of the variable REGION equal to truncate(16*dmin/dmaj). REGION is an integer which varies from 0 to 15 (assuming 4 fraction bits) in accordance with a preferred embodiment of the present invention, wherein each step in REGION represents a slope increase of 1/(1 shl (fract_bits)). REGION may vary depending on the number of fraction bits employed. "shl" is a function that shifts all of the 1's and 0's in a binary representation of a number left by some amount. x1 shl fract_bits represents a shift of x1 by fract_bits. This function represents a multiplication of x1 by $2^n$, where n is equal to the number of fract_bits.

The process then proceeds to block 362, which illustrates the setting of the cover variable COVER equal to (majoff*REGION/16)−minoff. The process proceeds to block 364, which depicts setting INC_21 equal to 2*REGION*dmaj. INC_21 is the incrementation term for the second error term. The process then proceeds to block 366, which illustrates the setting of INC_22 equal to INC_21−2* dmaj (shl fract_bits). INC_22 is an increment value for the second error term.

Next the process proceeds to block 367, which depicts the initialization of INC1 by setting INC1 equal to dmin shl (fract_bits+1). INC1 is the incrementation term for the first error term. The process then proceeds to block 368, which illustrates the initialization of INC 2 by setting INC 2 equal to INC 1−dmaj shl (fract_bits +1). INC 2 is in increment value for the first error term.

Afterward, the process proceeds to block 369, which depicts the initialization of the first error term (Err) by setting Err equal to 2*dmin*majoff−2*dmaj*- minoff−dmaj shl (fract_bits). The process next proceeds to block 370, which illustrates the initialization of the second error term (Err_2) by setting Err_2 equal to Err. Thereafter, the process terminates as depicted in block 372.

Figure 6:
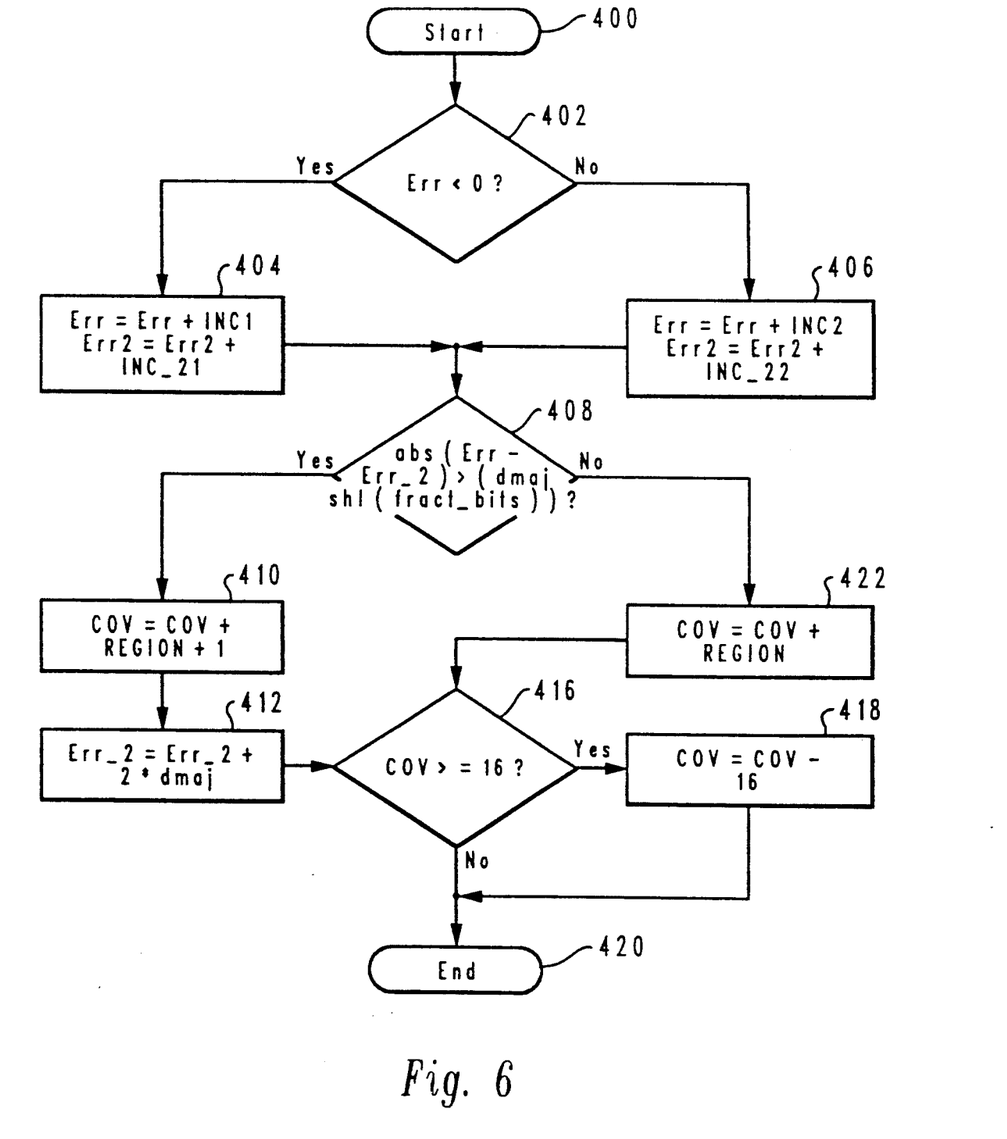
FIG. 6 is a logical flowchart of the spinning of the vector generator and the incrementation of coverage in accordance with a preferred embodiment of the present invention.

Referring now to FIG. 6, there is depicted a logical flowchart of the spinning of the vector generator and the incrementation of coverage in accordance with a preferred embodiment of the present invention. The process begins as illustrated in block 400 and thereafter proceeds to block 402, which depicts a determination of whether Err is less than zero. If Err is less than zero, the process then proceeds to block 404, which illustrates the incrementing of Err by INC1 and the incrementation of the second error term, Err_2, by INC_21. Referring back to block 402, if Err is not less than zero the process proceeds to block 406, which depicts the incrementing of Err by INC2 and the incrementing of Err_2 by INC_22.

In both cases, the process proceeds to block 408, which illustrates a determination of whether or not the distance between the first error term, Err, and the second error term Err 2 is greater than dmaj, the delta or change in the major axis by the line shifted left by the fraction bits. If abs(Err−Err_2), also called an intensity error term is greater than (dmaj shl(fract_bits)), the process then proceeds to block 410, which depicts, incrementing the pixel coverage, COVER, by REGION+1. Thereafter, the process proceeds to block 412, which illustrates incrementing Err_2 by 2dmaj.

Afterward, the process proceeds to block 416, which depicts a determination of whether or not COVER is greater than or equal to 16. If COVER is greater than or equal to 16, the process proceeds to block 418, which illustrates subtracting 16 from COVER. Thereafter, the process terminates as depicted in block 420. COVER is compared to the value 16 in block 416 since 16 different pixel intensities are utilized in accordance with a preferred embodiment of the present invention. This number will change depending on the number of pixel intensities employed.

Referring back to block 408, if the intensity error term or abs(Err−Err_2) is less than dmaj shl (fract_bits), the process then proceeds to block 422 which depicts incrementing COVER by REGION. Afterward, the process proceeds to block 416, which illustrates a determination of whether or not COVER is greater than 16. If COVER is greater than 16 the process proceeds to block 418, which illustrates subtracting 16 from COVER with the process terminating in block 420. Referring back to block 416 if COVER is less than 16 the process terminates as illustrated in block 420.

Figure 7:
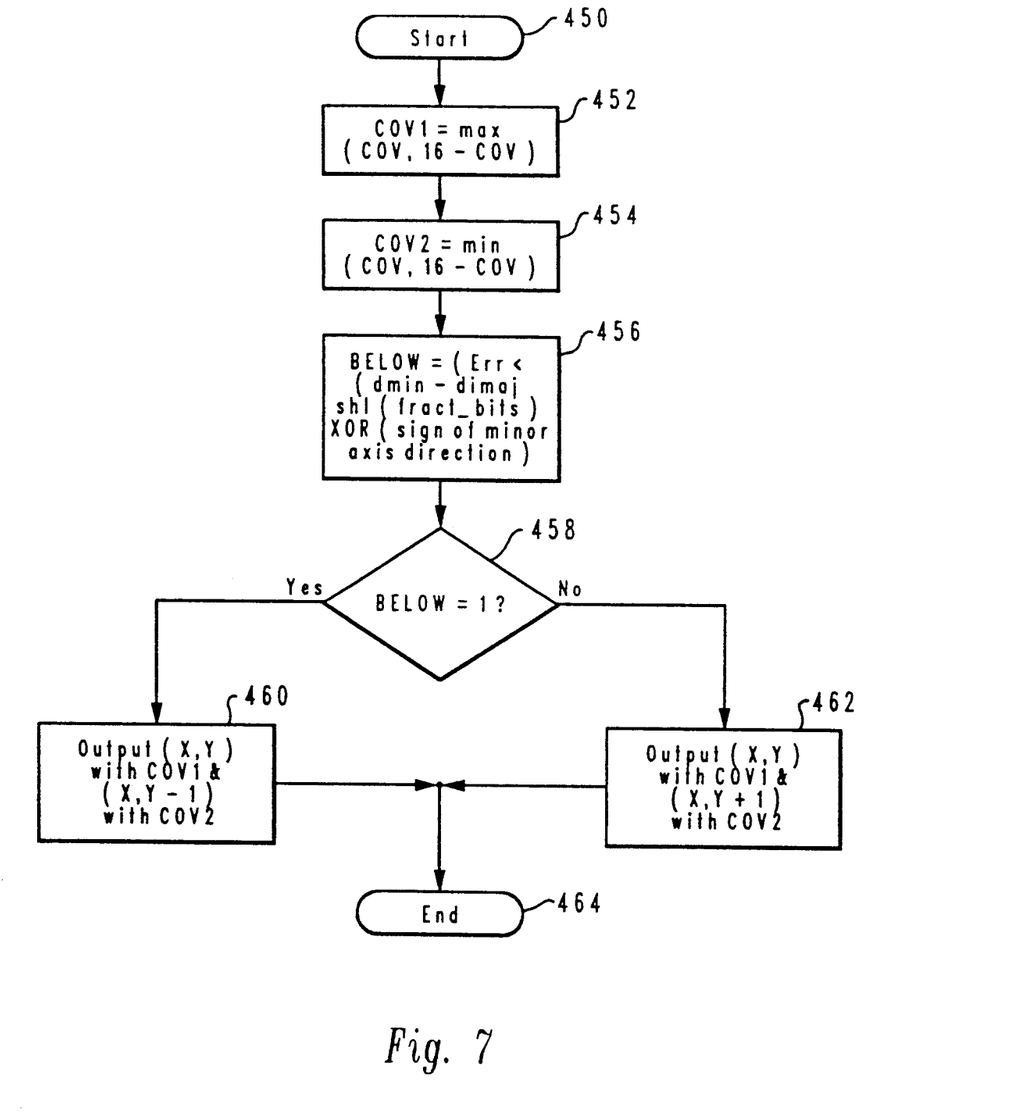
FIG. 7 depicts a logical flowchart of pixel intensity output pixel coordinate generation in accordance with a preferred embodiment of the present invention.

After a value for COVER has been determined, pixel intensities and pixel coordinates may be generated. Referring now to FIG. 7, there is depicted a logical flowchart of pixel intensity output and pixel coordinate generation in accordance with a preferred embodiment of the present invention. As illustrated, the process begins in block 450 and thereafter proceeds to block 452, which depicts a determination of COVER1 based on accumulated coverage indicated by COVER. COVER1 is equal to the maximum of COVER or 16−COVER. Thereafter the process proceeds to block 454, which depicts the setting of COVER2 equal to the minimum of COVER or 16−COVER. As a result, coverages for two output pixels may be determined.

Afterward, the process proceeds to block 456, which depicts setting BELOW equal to [(Err<(dmin−dmaj shl(fract_bits)) XOR (sign of minor axis direction)]. Afterward, the process proceeds to block 458, which illustrates a determination of whether or not the second pixel is below the closest pixel. This determination is made by examining the value of the variable BELOW. If BELOW is false or equal to zero, the second pixel is not BELOW the closest pixel and the process proceeds to block 462, which depicts assigning pixel intensity by setting the output of the pixel at (x,y) with COVER1 and the output of the pixel at (x,y+1) with COVER2. Thereafter, the process terminates as illustrated in block 464.

Referring back to block 458, if the second pixel is below the closest pixel, as determined by the variable BELOW being true not equal to zero) the process then proceeds to block 460, which depicts assigning pixel intensity by setting the output of the pixel at (x,y) with COVER1 and the output of the pixel at (x,y−1) with COVER2. Thereafter the process terminates as illustrated in block 464.

Figure 8:
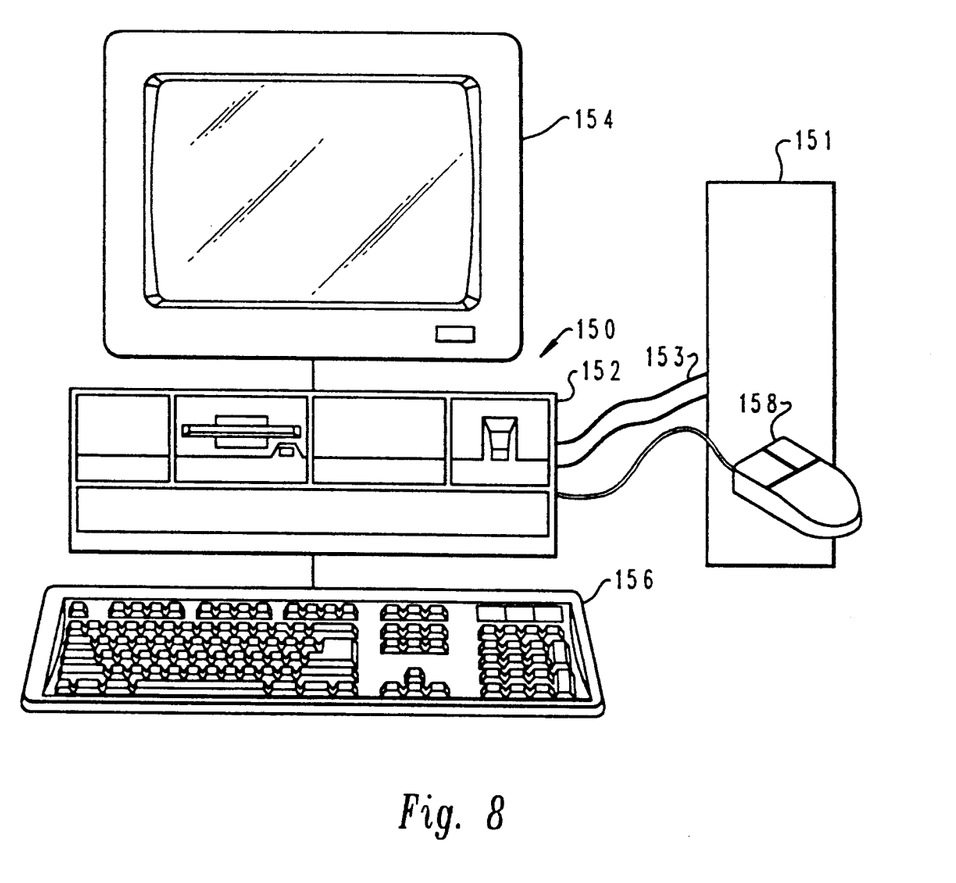
FIG. 8 is a pictorial representation of a computer in which a preferred embodiment of the present invention may be implemented.

FIG. 8 depicts computer 150 in which a preferred embodiment of the present invention may be implemented. Computer 150 includes system unit 152, video display terminal 154, keyboard 156, and mouse 158. Computer 150 also has external graphics adapter 151 attached to it via cable 153. Computer 150 may be any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation. Other types of data processing systems, such as for example, intelligent work stations or mini-computers may be utilized.

Figure 9:
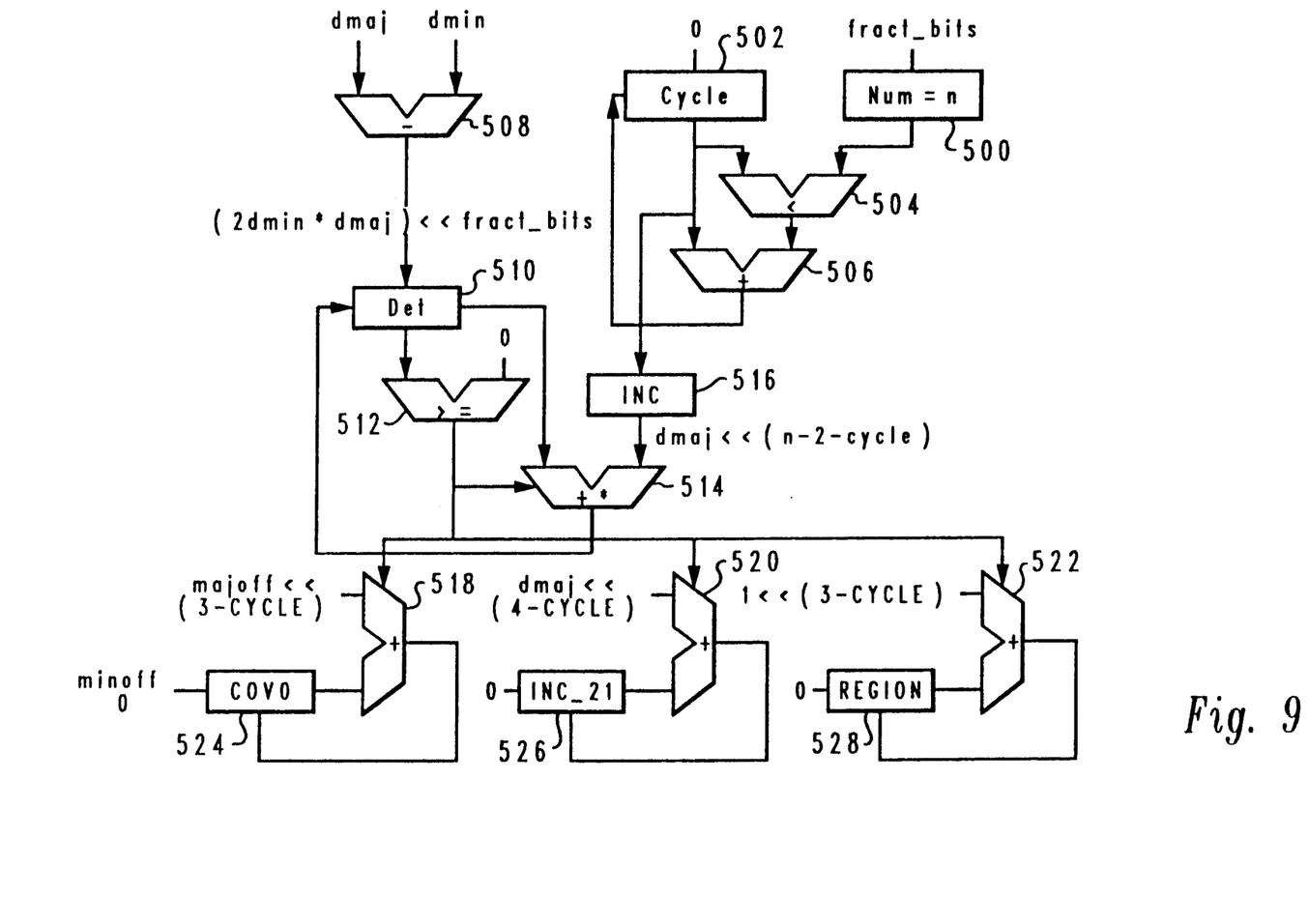
FIG. 9 is a block diagram schematically illustrating the generation of initial values for double error antialiasing in accordance with a preferred embodiment of the present invention.

The present invention may be implemented in software or in hardware. Additional hardware may be added to a graphics adapter in accordance with a preferred embodiment of the present invention. With reference now to FIG. 9, there is depicted a block diagram schematically illustrating generation of initial values for double error antialiasing in accordance with a preferred embodiment of the present invention. In calculating initial values REGION, COV0, INC_21, four cycles are utilized in accordance with a preferred embodiment of the present invention.

The variable NUM is set by the number of fraction bits entered into block 500, which in this case is four. In other instances, the number of fraction bits may vary. In such a situation, the number of cycles utilized to generate the initial values will also vary. The number of cycles is stored in register 502 and initially is zero. If the cycle number is less than the fraction bit value at comparator 504, a one is output from comparator 504 into adder 506. The present cycle value is also input into adder 506, thus increasing the cycle value by one. This value is stored in register 502. If the cycle value is greater than the NUM value set by the fraction bits, the cycle is not incremented in register 502.

The values dmaj and dmin are directed into subtracter 508, which performs the function (2dmin−dmaj) shl fract_bits. The shift left function also is shown by "<<". The result from subtracter 508 is directed into register 510 as the determinant (Det). The value Det from register 510 is input into comparator 512 and compared against the value of zero. If the Det is greater than or equal to zero the output will be true. Otherwise, the output will be false. The output from comparator 512 is in the form of a single bit with a value of zero being false and a value of one being true.

Comparator 512 controls combined adder/subtracter 514. If the output from comparator 512 is true, combined adder/subtracter 514 will subtract INC from Det stored in register 510. If the value from comparator 512 is false, combined adder/subtracter 514 will add INC to Det from register 510. INC is determined in block 516 by the function dmaj shl (n-2-cycle). The output of combined adder/subtracter 514 is the new Det value and is stored in register 510.

The output of comparator 512 is also employed to control adders 518, 520, and 522. Register 524 stores COV0 and register 526 stores INC_21; register 528 stores the value REGION. COV0 is generated during the four cycles in accordance with a preferred embodiment of the present invention. In each cycle where the output from comparator 512 is true, the value in COV0 has a value added to it as a function of the present cycle value. The value resulting from majoff shl (3-cycle) is added to the value from register 524. The output from adder 518 is stored in register 524. The initial value for COV0 in register 524 is zero. At the end of the cycles, minoff is subtracted from register 524 to produce the final value for COV0.

Similarly, register 526 has an initial value of zero and represents INC_21. This value is incremented by dmaj shl (4-cycle) each time the Det is greater than or equal to zero. The output from adder 520 is stored in register 526. The value for region in register 528 also starts with a value of zero. Each time Det is greater than or equal to zero, adder 522 is activated adding 1 shl(3-cycle) to the value REGION in register 528. As a result, each time the adder is activated, the value in register 528 increments by some amount.

Figure 10:
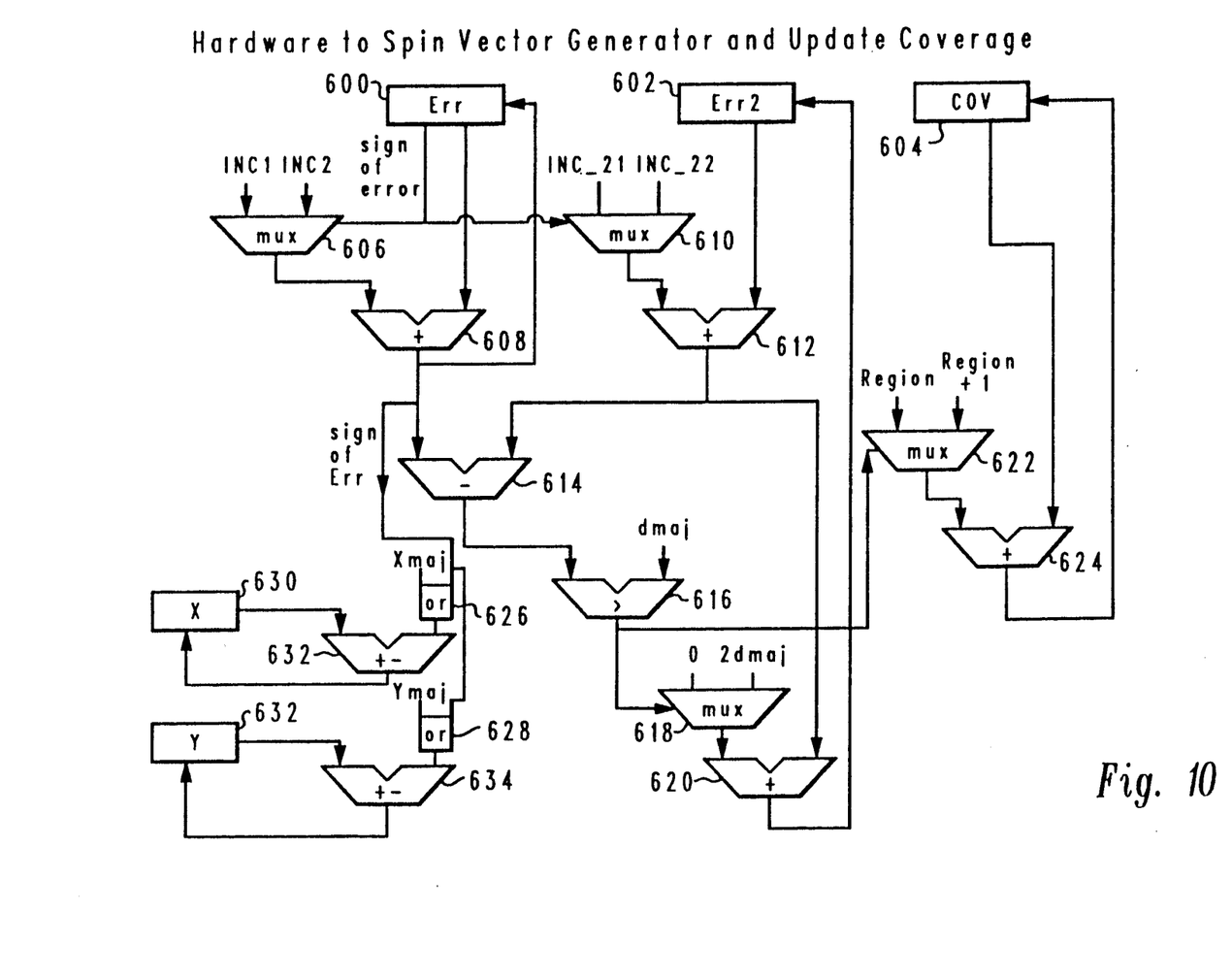
FIG. 10 depicts a block diagram schematically illustrating a system for generating vectors and updating coverage values in accordance with a preferred embodiment of the present invention.

With reference to FIG. 10, there is depicted a block diagram schematically illustrating a system for generating vectors and updating coverage values in accordance with a preferred embodiment of the present invention. Registers 600, 602, and 604 store the values ERR, ERR_2, and COVER respectively. Multiplexer 606 is utilized to determine whether INC1 or INC2 will be selected as a value for input into adder 608. The output multiplexer 606 is controlled by the sign of the first error term from register 600. INC2 is selected if the sign of Err is positive and INC1 is selected if Err is negative. Adder 608 adds the selected input from multiplexer 606 to the error term Err stored in register 600. The output of multiplexer 610 is controlled by the sign of the first error term in multiplexer 600. INC_22 is selected if the sign of Err is positive, and INC_21 is selected if Err is negative. The output from multiplexer 608 is stored in register 600 as the new Err value.

Multiplexer 610 is employed to select the value INC_21 or INC_22 to be directed into adder 612. The selected value from multiplexer 610 is added to ERR_2. The output from adders 608 and 612 are input into subtracter 614. The output value from subtracter 614 is the value resulting from ERR-ERR_2. This value is compared with dmaj in comparator 616.

In turn, the output from comparator 616 is employed to select which input into multiplexer 618 will be utilized as an input into adder 620. If the output from subtracter 614 is greater than the dmaj, the value dmaj will be sent into adder 620. Otherwise, the value zero will be directed from multiplexer 618 into adder 620.

The selected value from multiplexer 618 is added to the value from adder 612, which is ERR_2 incremented by INC_21 or INC_22 at adder 620. The output from adder 620 is stored in register 602 and becomes the new Err_2.

The output from comparator 616 also is utilized to control multiplexer 622. Multiplexer 622 has REGION and REGION+1 as input values. If ERR-ERR_2 is greater than dmaj, the value REGION+1 will be selected as an input into adder 624. Otherwise, the value REGION is selected as an input into adder 624. The value in register 604 is added to the value selected by multiplexer 622 in adder 624. The resulting output from adder 624 is stored in register 604 as the new COVER value.

The sign of Err from multiplexer 608 is directed into blocks 626 and 628. Block 626 outputs a value of one if the x-axis is the major axis or if the sign of Err is positive. Similarly, block 628 results in a one at the output terminal if the y-axis is the major axis or if the sign of Err is positive. The output from block 626 is added to the current x value in register 630 at adder/subtracter 632.

Whether the value from register 630 is incremented or decremented each time depends on which direction the vector generator is generating pixels for the line. For example, if the x axis is the major axis and pixels are being generated from left to right on a grid with a positive slope, the x value is always incremented. On the other hand, if the generation of pixels is from right to left the x value will be decremented each time. In this example, the y-coordinate value in register 632 is added with a 1 from block 628 in adder/subtracter 634 if the sign of Err is positive.

EXAMPLE 1

Figure 11:
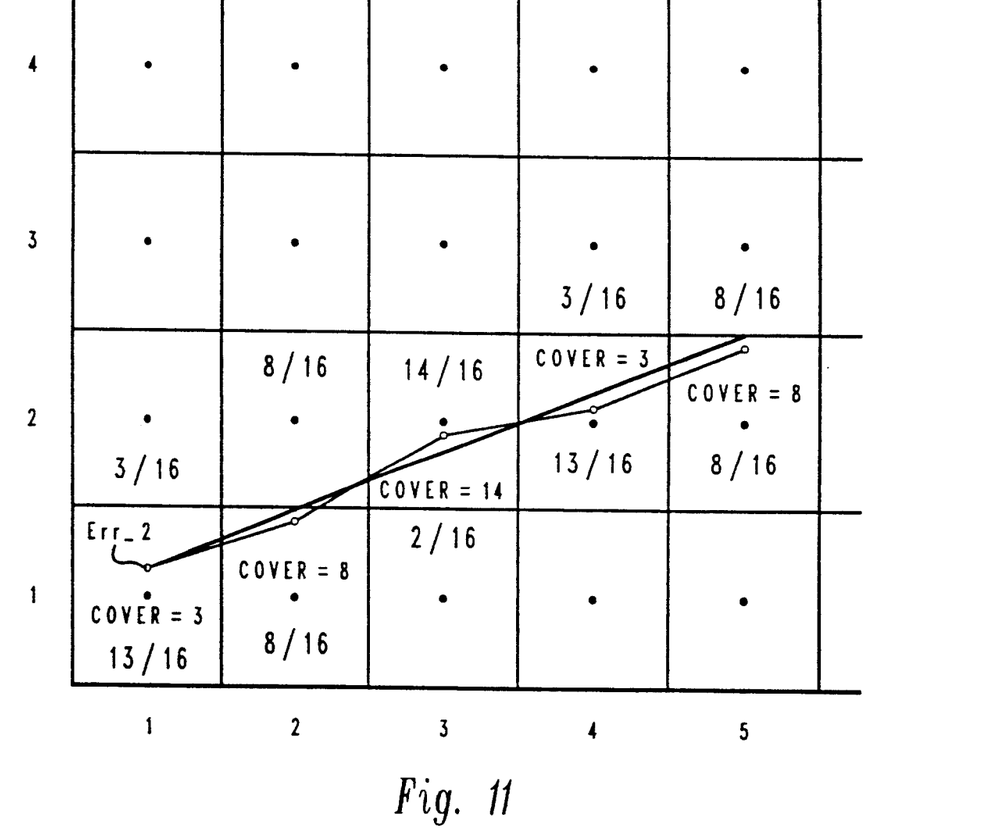
FIG. 11 is the pixel intensity of a line displayed in a raster format and antialiased utilizing a double error method and system in accordance with a preferred embodiment of the present invention.

The following is an example of the steps followed in smoothing a line in accordance with a preferred embodiment of the present invention. The steps and results of this example are illustrated in FIG. 11 will be shown:

| Initial values |
| --- |
| Line from (1.25, 1.25) to (5.0, 2.5) |
| fract_bits = 4    one = 1 shl 4 = 16 |
| dmaj = dx shl (fract_bits) = 60 |
| dmin = dy shl (fract_bits) = 20 |
| Region = 5 |
| Xoff = −4    Yoff = −4 |
| INC1 = dmin shl (fract_bits + 1) = 640 |
| INC2 = INC1 − dmaj shl (fract_bits + 1) = −1280 |
| INC_21 = 2 * Region * dmaj = 600 |
| INC_22 = INC_21 − dmaj shl(fract_bits + 1) = −1320 |
| Err$_0$ = 2*dmin*majoff 2*dmaj*minoff − dmaj shl (fract_bits) = −640 |
| COVER$_0$ = round (majoff*Region/one − minoff) = 3 |

TABLE I

| X | Y | Err | Err_2 | increment to Err_2 | COV | Area |
| --- | --- | --- | --- | --- | --- | --- |
| 1 | 1 | −640 | −640 | — | 3 | 13/16 |
| 2 | 1 | 0 | −40 | INC_21 | 8 | 8/16 |
| 3 | 2 | −1280 | −1240 | INC_22 + 2*dmaj | 14 | 14/16 |
| 4 | 2 | −640 | −640 | INC_21 | 3 | 13/16 |
| 5 | 2 | 0 | −40 | INC_21 | 8 | 8/16 |

While the invention has been particularly shown and described with reference to a preferred embodiment, it will be understood by those skilled in the art that various changes in form and detail may be made therein without departing from the spirit and scope of the invention.

What is claimed is:

1. An apparatus for generating an antialiased approximation of a line displayed within a data processing system having a raster-scan device for generating images within a two-dimensional grid comprising rows and columns of pixels, said apparatus comprising:

means for receiving a graphics data stream in memory in a graphics adapter from said data processing system;

means, responsive to a presence of a line in said graphics data stream, for generating a plurality of parameters according to Bresenham's algorithm for said line, wherein said plurality of parameters comprises a first error term and a second error term;

means for generating a pixel intensity for an initial pixel for a pixel approximation of said line;

a vector generator in a graphics adapter for (1) comparing said first error term with a threshold to determine an amount of error; (2) adjusting said first error term by a first selected amount in response to comparing said first error term and adjusting said second error term by a second selected amount in response to a comparison of said first error term; (3) selecting a first pixel proximate to said initial pixel by comparing said first adjusted error term with a second threshold to locate a pixel closest to an intersection of said line and a minor axis and assigning said first pixel a first intensity based on said comparison of said second adjusted error term with said first error term; (4) selecting second pixel proximate to said first pixel in response to selecting said first pixel and assigning said second pixel a second intensity based on said comparison of said second adjusted error term with said first error term; and means for sending a data stream to said raster-scan device for displaying an antialiased approximation of a line utilizing assigned pixel intensities on said raster-scan device.

2. The apparatus of claim 1, wherein said line has an end and said vector generator continues to return to said step of comparing said first error term to said threshold until said end of said line is encountered.

3. The apparatus of claim 1, wherein said pixel and said another pixel are located proximate to each other along a minor axis.

4. The apparatus of claim 3, wherein if said first error term is less than said predetermined threshold, said first error term is incremented by a first value resulting from a delta of said line along a major axis multiplied by $2^n$, where n is a number of fraction bits utilized in subpixel addressing and wherein if said first error terms is greater than or equal to said predetermined threshold, said first error term is incremented by a second value resulting from subtracting said delta multiplied by $2^n$ from said first value.

5. The apparatus of claim 4, wherein if said first error term is less than said predetermined threshold, incrementing said second error term by $$INC\_21 = 2*REGION*dmaj$$

wherein REGION is a value indicating a region in a first octant subdivided into a selected number of regions and dmaj is a delta of said line along a major axis, and if said first error term is greater than or equal to said predetermined threshold, incrementing said second error term by:

$$INC\_22 = INC\_21 - 2dmaj*2^n$$

wherein n is equal to a selected number of fraction bits.

6. The apparatus of claim 3, wherein said pixel intensity is assigned by comparing said first pixel and said second pixel to an intersection of said line with said minor axis assigning a higher intensity to the pixel closest to said line at said intersection.

7. The apparatus of claim 6, wherein both said first pixel and said second pixel are assigned equal intensities if said first pixel and said second pixel are both equidistant from said intersection.

8. The apparatus of claim 1, further including means for subpixel addressing.

9. A data processing system for generating and displaying an antialiased approximation of a line, said data processing system comprising:

a graphics adapter including:

an input for receiving a graphics data stream;

means, responsive to receiving, in said memory, a line in said graphics data stream, for generating a plurality of parameters according to Bresenham's algorithm for said line, wherein said plurality of parameters comprises a first error term and a second error term;

means for generating a pixel intensity for an initial pixel for a pixel approximation of said line;

means for comparing said first error term with a threshold to determine an amount of error;

means for adjusting said first error term by a first selected amount in response to said means for comparing said first error term and means for adjusting said second error term by a second selected amount in response to said means for comparing of said first error term;

means for selecting a first pixel proximate to said initial pixel comprising means for comparing said first adjusted error term with a second threshold to locate a pixel closest to an intersection of said line and a minor axis and means for assigning said first pixel a first intensity based on said comparison of said second adjusted error term with said first error term;

means for selecting second pixel proximate to said first pixel in response to means for selecting said first pixel and means for assigning said second pixel a second intensity based on said comparison of said second adjusted error term with said first error term; and a raster-scan device, coupled to said graphics adapter, for generating images within a two-dimensional grid comprising rows and columns of pixels, wherein an antialiased approximation of a line may be displayed utilizing assigned pixel intensities from the graphics adapter.

10. The data processing system of claim 9, wherein said means for comparing, said means for adjusting, said means for selecting a first pixel, and said means for selecting a second pixel are in a vector generator in said graphics adapter 11. The data processing system of claim 9, wherein said pixel and said another pixel are located proximate to each other along a minor axis.

12. The data processing system of claim 11, wherein if said first error term is less than said predetermined threshold, said first error term is incremented by a first value resulting from a delta of said line along a major axis multiplied by $2^n$, wherein n is a number of fraction bits utilized in subpixel addressing and wherein if said first error terms is greater than or equal to said predetermined threshold, said first error term is incremented by a second value resulting from subtracting said delta multiplied by $2^n$ from said first value.

13. The data processing system of claim 12, wherein if said first error term is less than said predetermined threshold, incrementing said second error term by $$INC\_21 = 2 * REGION * dmaj$$

wherein REGION is a value indicating a region in a first octant subdivided into a selected number of regions and dmaj is a delta of said line along a major axis, and if said first error term is greater than or equal to said predetermined threshold, incrementing said second error term by:

$$INC\_22 = INC\_21 - 2dmaj * 2^n$$

wherein n is equal to a selected number of fraction bits.

14. The data processing system of claim 11, wherein said pixel intensity is assigned by comparing said first pixel and said second pixel to an intersection of said line with said minor axis assigning a higher intensity to the pixel closest to said line at said intersection.

15. The data processing system of claim 14, wherein both said first pixel and said second pixel are assigned equal intensities if said first pixel and said second pixel are both equidistant from said intersection.

16. The data processing system of claim 9, further including means for subpixel addressing.

* * * * *